United States Patent Office 2,726,213
Patented Dec. 6, 1955

2,726,213
LIQUIDS HAVING IMPROVED TEMPERATURE-VISCOSITY RELATIONSHIP

Ettore da Fano, Raritan, N. J., assignor to John B. Pierce Foundation, New York, N. Y., a corporation of New York No Drawing. Application February 18, 1950, Serial No. 145,082

1 Claim. (Cl. 252—78)

This invention relates to liquids that are characterized by a desirable viscosity and temperature-viscosity relationship, and therefore suitable for use as hydraulic fluids, and to hydraulic systems embodying the same as the power transmitting fluid.

Most liquids have the property of becoming viscous or thick when their temperature is lowered, and of becoming thin or less viscous as their temperature is raised. If the temperature-viscosity relationship is plotted on an A. S. T. M. viscosity-temperature chart (D 341–43), with the temperature in degrees F. on the abscissa and the viscosity (expressed in centistokes) on the ordinate, a substantially straight line usually results. The slope of this curve is an indication of the temperature-viscosity relationship. It is apparent that if the viscosity were not changed at all with a change in temperature, the plotted curve would be horizontal or flat. The less the slope of the plotted curve deviates from a flat position, the better is the temperature-viscosity relationship.

Many liquids should have a relatively flat temperature-viscosity curve, for instance, liquids which are to function as lubricants at both high and low temperatures, fluids for hydraulic brakes and gun recoil mechanisms, fluids for transferring heat over a wide temperature range, etc.

It is an object of the present invention to provide a liquid that has an exceptionally flat temperature-viscosity curve.

It is a further object to provide a power transmitting system for hydraulic machinery comprising a movable member and associated therewith as the power transmitting means a liquid the slope of whose temperature-viscosity curve is exceptionally low.

Previously it has been proposed to use silicoortho-esters for purposes which require a liquid of high boiling point that remains liquid at low temperatures. These previously-known materials are disadvantageous in some circumstances, for example, in a hydraulic system, because their viscosity becomes too high at a low temperature, or too low at a high temperature, or both. In other words, the slope of their temperature-viscosity curve is not low enough.

It has been discovered in accordance with the invention that a liquid which is satisfactory for the purposes contemplated comprises a mixture of (1) a viscous polymeric material with (2) a nonviscous monomeric material. The polymeric material is a non-silicate and is one of the so-called high polymers. The monomeric material is a silicic acid ester and is an orthosilicate or hydroxysilicate. These may be made by any of several known methods.

Mixtures in accordance with the invention have a viscosity of not more than 1,000 centistokes at —40° F. and not less than 5 centistokes at 130° F. Compositions of the invention may be made which have a viscosity at —40° F. of not over 500 centistokes and a viscosity at 130° F. of not less than 10 centistokes by a suitable blend of components. The viscosity of the liquids comprising my invention, as it will be seen later, is exceptionally low at —40° F., and this renders these materials suitable for use in mechanisms subject to the low temperatures often encountered in severe winter climates.

The above liquid mixtures can be considered essentially as a mixture of a polymeric non-silicic high polymer with a monomeric silicic acid ester.

In the above compositions it will be seen that one of the components is a monomeric silicic acid ester.

The following example is illustrative of the invention:

*Example 1.*—A polymeric non-silicate, polymerized methyl acrylic acid ester, available as "Acryloid HF855," in an amount of 17%, was mixed with 83% of cresyl tri-iso-propyl orthosilicate.

Acryloid HF–855 is a 55% solution of polymerized methyl ester of acrylic acid (also sometimes termed "polymethyl acrylate" or "polymerized methyl acrylic acid ester") in 200° F. minimum flash oil, said solution having a flash point of 215° F. and a fire point of 225° F. when diluted to 30% solids with base oil, and said solution having a viscosity of 55 cs. at 210° F. and a neutralization number of 0.3.

Instead of the polyacrylic resin other highly polymerized materials may be used, for example, polyisobutylene (such as is available under the trade name "Vistanex") (which have been suggested for improving the viscosity index of lubricating oils). It is significant that the combination of these high polymers, such as "Acryloid," when used with an orthosilicate result in much flatter viscosity curves than when used with other materials.

The viscosity of the material in this example together with other reference viscosities and the viscosities of other materials for comparison are included in the following table:

| Item No. | Example No. | Viscosity in Centistokes at— | |
|---|---|---|---|
| | | —40° F. | +130° F. |
| 1 | | 1,000 | 5. |
| 2 | | 500 | 10. |
| 3 | 1 | 150 | 10. |
| 4 | | 22,000 | 8.5 |
| 5 | | 36.8 | 2.2 |

In item 1, the viscosity limits of the invention are set forth, namely, a maximum viscosity of 1,000 at —40° F. and a minimum viscosity of 5 at 130° F.

Item 2 sets forth the viscosity reference desired, if possible, by the U. S. Army and Navy, namely a liquid having a viscosity of not over 500 centistokes at —40° F. and not less than 10 centistokes at 130° F.

Item 3 sets forth the viscosities of Example 1 in which it will be noted that the viscosity ranges more clearly within the requirements of the Army and Navy.

Item 4 gives the viscosities of diphenyl dicresyl orthosilicate (monomeric). In this case, it will be seen that the material is entirely unsatisfactory for the purpose of the invention because of the unusually high viscosity at the low temperature.

Item 5 sets forth the viscosity of dimethyldiphenyl orthosilicate, and it will be seen that this clearly does not meet the high temperature viscosity requirements.

Tests on the above materials and a study of the theory and factors explanatory of the above results have led to the conclusion that the organic esters of silicic acid in the monomeric form, have the unique property of imparting a viscosity variation to a liquid mixture which is less than other liquids.

The silicates may be aryl, alkyl or aralkyl orthosilicates in which the radicals may be phenyl, naphthyl, anthracyl, diamylphenyl, xylenyl, cresyl, or methyl, ethyl, propyl, isopropyl, tertiary butyl and mixed aryl and/or alkyl radicals.

In addition to the desirable viscosity relationships described the liquids have the further advantages that they have relatively good chemical stability. They are not gummy and do not form sludge. They are noncorrosive to metals, and in fact act as a protector for metal. They are not difficult to contain in a cylinder and exert a lubricating action on the surfaces that they contact. They are non-toxic and do not involve any explosive or fire hazard. They are useful over long periods of time without special precautions since there is little, if any, evaporation or decomposition.

The liquids of the invention may be employed in any type of hydraulic apparatus including a chamber having a movable member disposed therein, wherein a liquid is utilized to effect movement thereof. Examples of such apparatus are dashpots, door checks, pumps, brakes, automatic transmission systems for automobiles and other vehicles, recoil mechanisms in artillery, shock absorbers and clutches.

All parts and percentages in the specification and claims are by weight.

I claim:

A liquid characterized by properties rendering it stable for use as the power transmitting means in a hydraulic system, including good chemical stability, which is non-gumming, nonsludging, nontoxic and noncorrosive, and which has a relatively flat temperature-viscosity curve, consisting essentially of about 83% by weight of cresyl-triisopropyl orthosilicate and about 17% by weight of a 55% solution of polymerized methyl ester of acrylic acid in 200° F. minimum flash oil, said solution having a flash point of 215° F. and a fire point of 225° F. when diluted to 30% solids with base oil, and said solution having a viscosity of 55 cs. at 210° F. and a neutralization number of 0.3.

References Cited in the file of this patent

UNITED STATES PATENTS

| | | |
|---|---|---|
| 2,129,281 | Lincoln | Sept. 6, 1938 |
| 2,270,352 | Sowa | Jan. 20, 1942 |
| 2,335,012 | Johnston | Nov. 23, 1943 |
| 2,383,605 | Lieber et al. | Aug. 28, 1945 |
| 2,398,662 | Morgan | Apr. 16, 1946 |
| 2,406,971 | Sowa | Sept. 3, 1946 |
| 2,408,983 | Kollen | Oct. 3, 1946 |
| 2,413,513 | Morill | Dec. 31, 1946 |
| 2,423,927 | Burk et al. | July 15, 1947 |
| 2,490,691 | Langkammerer | Dec. 6, 1949 |
| 2,528,348 | Denison et al. | Oct. 31, 1950 |
| 2,528,535 | Merker | Nov. 7, 1950 |
| 2,549,270 | Watson | Apr. 17, 1951 |